United States Patent [19]

Bauer et al.

[11] Patent Number: 5,894,662
[45] Date of Patent: *Apr. 20, 1999

[54] METHOD OF MAKING A TRUNNION

[75] Inventors: Rudolf Bauer; Horst Doppling, both of Herzogenaurach, Germany

[73] Assignee: INA Walzlager Schaeffler KG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/665,559

[22] Filed: Jun. 18, 1996

[30] Foreign Application Priority Data

Aug. 8, 1995 [DE] Germany .............. 195 29 043

[51] Int. Cl.$^6$ .................................................. B23P 15/00
[52] U.S. Cl. ........................................ 29/888.2; 29/888
[58] Field of Search ........................ 29/888, 888.2, 29/558; 123/90.41; 74/559; 72/355.6; 83/49, 51, 694, 623

[56] References Cited

U.S. PATENT DOCUMENTS

| | | | |
|---|---|---|---|
| 1,349,915 | 8/1920 | Quast | 83/623 |
| 2,088,119 | 7/1937 | Schiltz | 29/558 |
| 4,086,832 | 5/1978 | Korytko | 83/694 |
| 4,347,724 | 9/1982 | Brown et al. | 83/51 |
| 4,653,370 | 3/1987 | Baudisch et al. | 83/694 |
| 5,060,606 | 10/1991 | Hubbard | 123/90.41 |

FOREIGN PATENT DOCUMENTS

| | | |
|---|---|---|
| 1938943 | 7/1964 | Germany . |
| 2608851 | 9/1977 | Germany . |

*Primary Examiner*—I Cuda
*Attorney, Agent, or Firm*—Bierman, Muserlian and Lucas

[57] ABSTRACT

A method for making a trunnion for a rocker arm or a finger lever of an internal combustion engine from a piece of rod-shaped ground stock by removal of a peripheral section to produce a flat bearing surface including forming the round stock into a barrel-shaped blank by upsetting, shaping the barrel-shaped blank into a rotationally symmetrical element including a central shoulder having a uniform diameter which is greater than the diameter of the trunnion and removing the peripheral section at any point from the central shoulder by shearing from two sides thereof in an axial direction of the rotationally symmetrical element whereby any cutting plane material from the central shoulder is directed towards a sheared surface whereby the bearing surface is a hardened surface.

7 Claims, 3 Drawing Sheets

METHOD OF MAKING A TRUNNION

FIELD OF THE INVENTION

The invention concerns a method of making a trunnion, particularly for use with rocker arms or finger levers of internal combustion engines, comprising at least one bearing surface extending parallel to a central axis and cutting knives for execution of the method.

BACKGROUND OF THE INVENTION

A trunnion of the above type for mounting a rocker arm is known from DE-U 19 38 943 and comprises a surface which is parallel to the central axis of the trunnion and constitutes a bearing surface for a fixing screw which is inserted through a bore perpendicular to the central axis. The screw head or the retaining nut of the screw bears against the bearing surface. It is also known in the art to make such trunnions as rotationally non-symmetrical parts with bearing surfaces by an upsetting procedure. A drawback of this method is that, due to an insufficient flux of material during the forming process, the bearing surface is inadequately configured, i.e. it slopes downwards towards its edges leaving a smaller effective bearing surface for the fixing screw. A remedy for this is sought in milling flat the bearing surface but this is an additional work step which increases the manufacturing costs. A further drawback is that a bearing surface post-milled in this way experiences no increase in hardness, that is to say, it is too soft.

OBJECTS OF THE INVENTION

It is an object of the invention to provide an improved trunnion with which the hitherto encountered drawbacks are avoided and which can be economically manufactured while possessing a certain minimum surface hardness.

It is another object of the invention to provide novel cutting knives useful in the process.

These and other objects and advantages of the invention will become obvious from the following detailed description.

SUMMARY OF THE INVENTION

The novel method of the invention of making a trunnion (7) for a rocker arm (1) or a finger lever of an internal combustion engine comprising at least one bearing surface (10) extending parallel to a central axis, is characterized in removing a peripheral section (19) from any point of the trunnion (7) in a random direction by shearing from both sides whereby a part of a material in a cutting plane is directed towards a sheared surface so that the bearing surface (10) thus obtained is a hardened surface.

The method of the invention results in the creation of a trunnion possessing a bearing surface which manifests the desired surface qualities without any secondary treatment (heat treatment). The bearing surface thus obtained does not slope down towards its edges so that the entire surface can be utilized for the abutment of the fixing screw and at the same time, the hardness of the surface is such that it can take even high loads.

Further developments of the invention are described more closely below. Thus, for example, it can be advantageous in certain cases of use to configure the trunnion so that the bearing surface is located on a shoulder having a larger diameter than the rest of the trunnion. In this case, the two-sided shearing is implemented on this part of the trunnion.

According to another feature of the invention, the shoulder is a central shoulder, i.e. it is situated at the center of the trunnion. In this case, the trunnion is made from round stock of a particular length and constant diameter which is first formed into a barrel-shaped blank having its largest diameter at the center and this blank is then transformed into a rotationally symmetrical element exhibiting a shoulder.

According to other provisions of the invention, the barrel-shaped blank can be formed by an upsetting procedure, and the central shoulder may be formed on the trunnion by a chipping procedure. Another feature of the invention calls for the central shoulder of the trunnion to be cylindrical or spherical in shape. The spherical configuration is particularly advantageous if the trunnion is required to be centered.

According to still another feature of the invention, the shearing is carried out in axial direction. In a further development of the invention, shearing is continued till a stud is formed at the center of the central shoulder and this is then cut-off in a separate work step. An uncontrolled tearing-off of the stud is thus prevented.

The cutting knives for implementing the method have a cutting edge with a negative geometry, i.e. they have a negative lead angle. The cutting knives may further comprise a hollow throat arranged behind the front end of the cutting edge and a projecting cam may be arranged behind the cutting edge.

Due to this geometry, meaning the negative lead angle, material in the lower region of the radius is directed towards the sheared surface and this leads to an increase in surface hardness. The hollow throat assures that the stud formed at the center during shearing is not torn off in an uncontrolled manner. The cam in turn effects that the transition region between the two shearing directions is evened out.

The invention will now be described more closely with the help of an example of a trunnion for the mounting of a rocker arm.

DETAILED DESCRIPTION OF THE DRAWINGS

Figure 1:
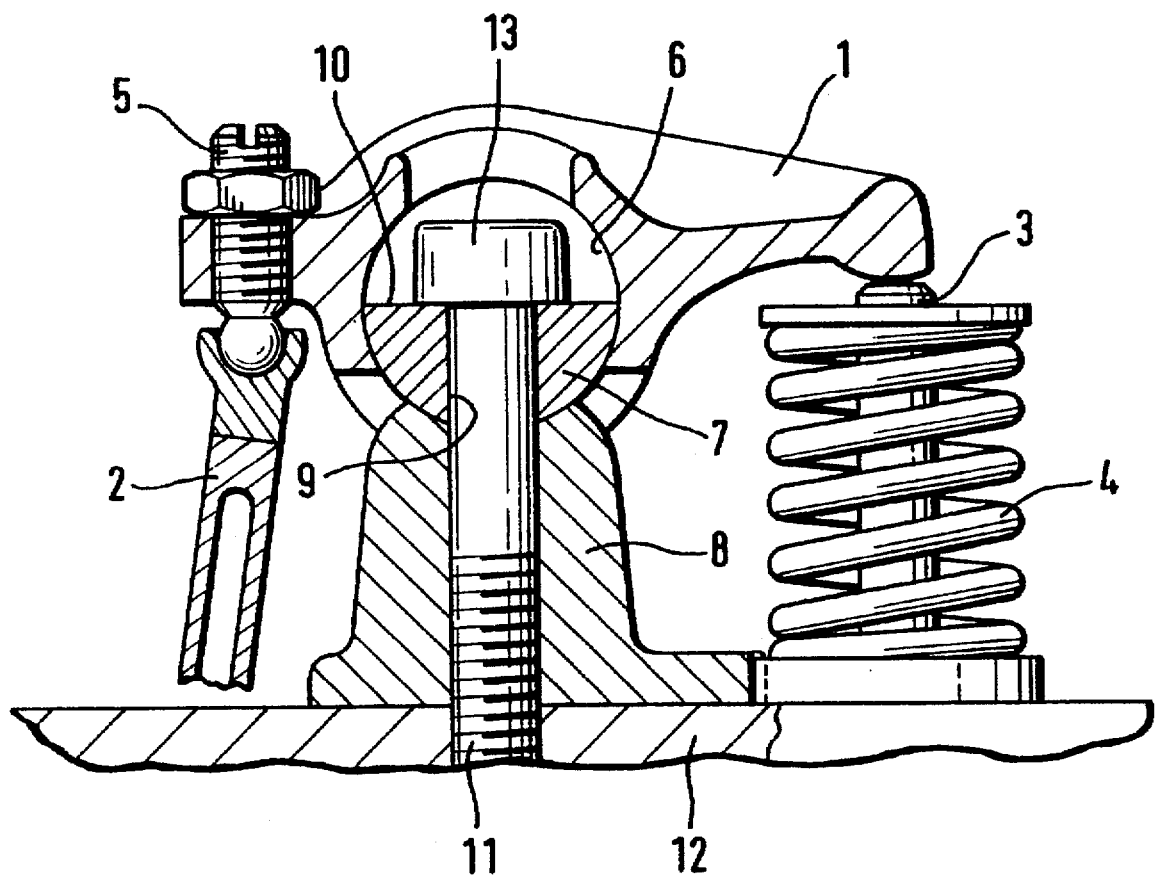
FIG. 1 is a longitudinal cross-section through a rocker arm mounting arrangement.

Referring now to the drawings and more particularly to FIG. 1, the rocker arm mounting arrangement comprises a rocker arm 1 engaged at one end by a lifter post 2 while a second end bears against a valve stem 3 of a valve, not shown, which is retained in its closed position by the force of a spring 4. The rocker arm 1 further comprises an adjusting screw 5 which engages the lifter post 2. The rocker arm 1 is pivoted on a trunnion 7 disposed in a reception bore 6 and retained in a trough of a pedestal 8. The trunnion 7 comprises a radial through-bore 9 at whose end is arranged a bearing surface 10. The rocker arm 1 is fixed by a fixing screw 11 on a cylinder head 12, and the screw head 13 of the fixing screw 11 bears against the bearing surface 10.

Figure 2:
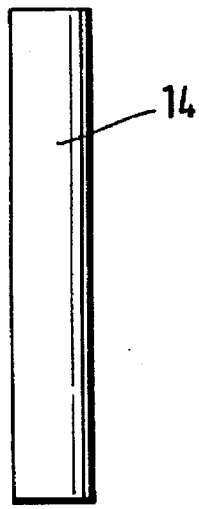
FIGS. 2–7 show different steps in the manufacturing of a trunnion.
Figure 3:
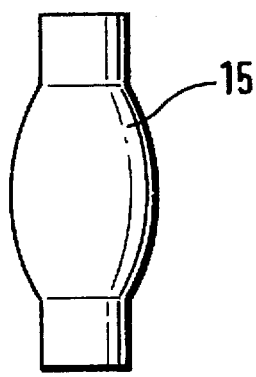
Figure 4:
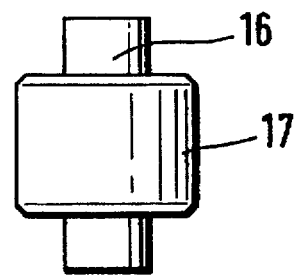
Figure 5:
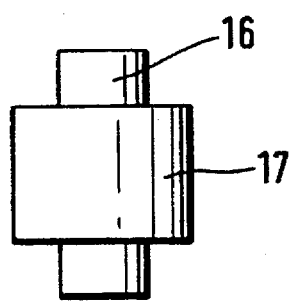
Figure 6:
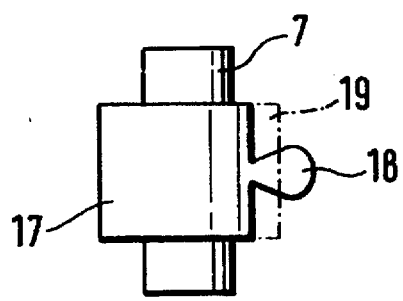
Figure 7:
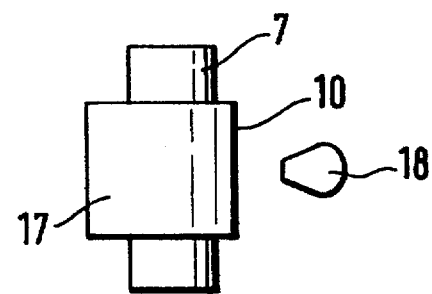

Starting from a piece of round stock 14 of a defined length and diameter as shown in FIG. 2, at first a barrel-shaped blank 15 shown in FIG. 3 is formed. This blank 15 is then transformed into a rotationally symmetrical element 16 which, as can be seen in FIG. 4, comprises a central shoulder 17 having a constant diameter. In the next step, this rotationally symmetrical element 16 is subjected to a further shaping process to sharpen its contours. This additional shaping step is represented by way of the non-rounded edges of the central shoulder 17 in FIG. 5. By shearing from both sides in axial direction, a peripheral section 19 is removed from the central shoulder 17 of the rotationally symmetrical element 16 whereby, as shown in FIG. 6, at first a shearing stud 18 is formed at the center of the central shoulder 17. The final step of the complete removal of the shearing stud 18 which results in the formation of the trunnion 7 with its bearing surface 10 can be seen in FIG. 7.

Figure 8:
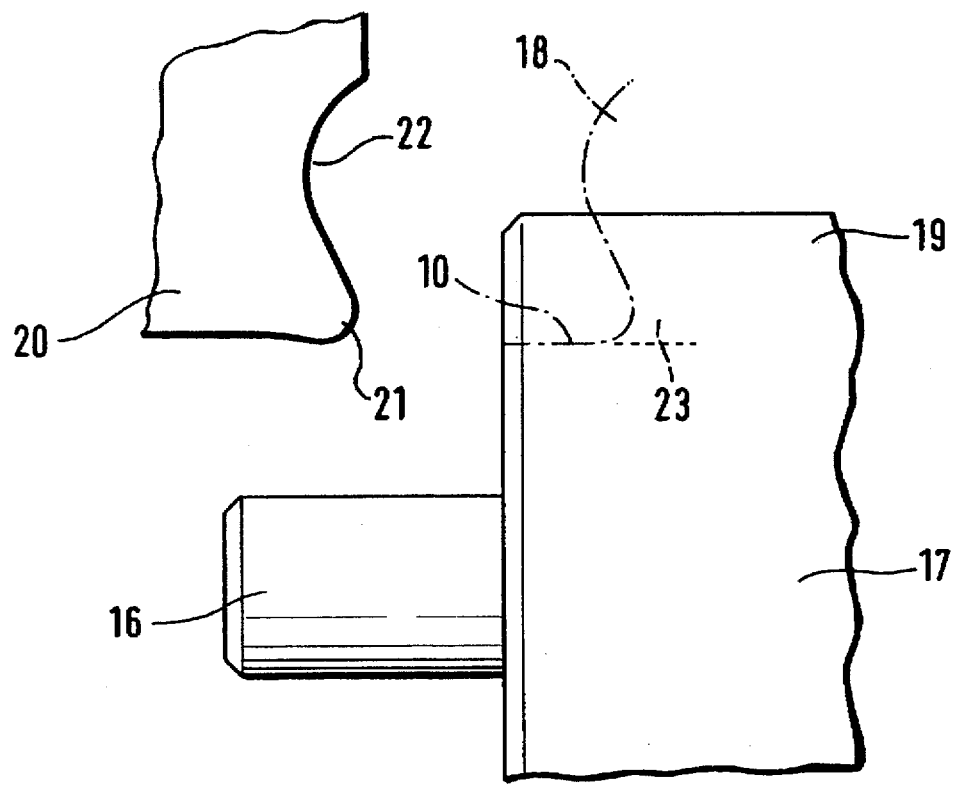
FIG. 8 shows a cutting knife having a hollow throat and a rounded cutting edge.

FIG. 8 shows a cutting knife 20 comprising a rounded cutting edge 21 and a hollow throat 22. One such knife 20 is placed on either side of the central shoulder 17 and the knives 20 are moved towards each other. For the sake of simplicity, however, only one knife is shown in the drawing. The method includes the cutting-off of a peripheral section 19 which is formed into a shearing stud 18 in a foregoing step. The shearing stud 18 is collected and retained in the hollow throats 22 of the two cutting knives 20. Due to the rounded cutting edges 21 of the cutting knives 20, a part of the material of the peripheral section 19 in the region designated at 23 is pressed towards the bearing surface 10 which is in the process of being formed and which thus experiences an increase in hardness. The shearing stud 18 formed at the center of the central shoulder 17 is separated in the next step.

Figure 9:
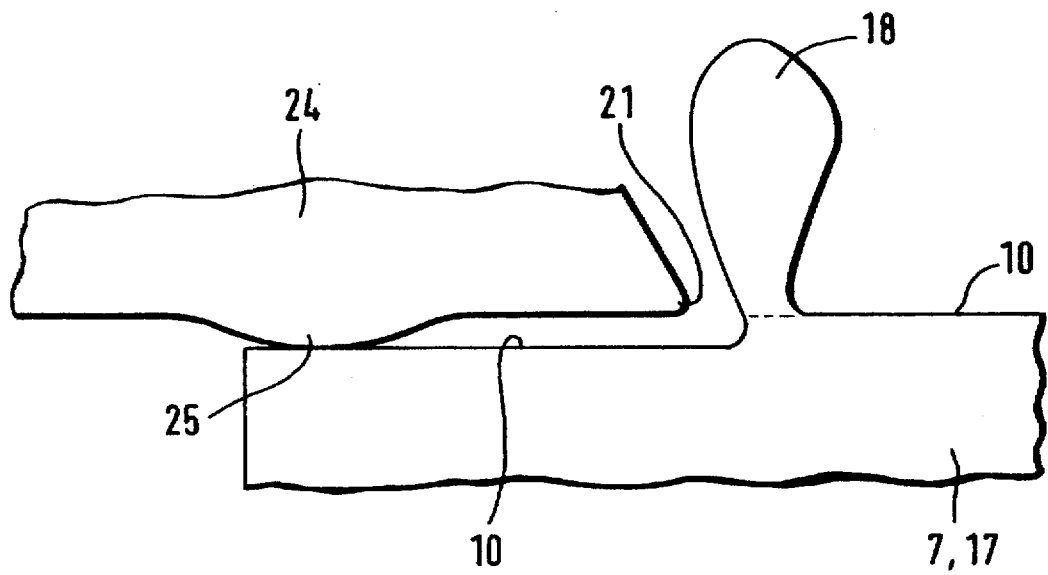
FIG. 9 shows a cutting knife having a projecting cam.

For manufacturing reasons, it is possible, as shown in FIG. 9, that two cutting planes be formed when shearing is carried out in two directions. This would mean that the bearing surface 10 would have an undesired stepped configuration. To avoid this, the shearing stud 18 is cut-off with a cutting knife 24 comprising a cam 25 which protrudes radially beyond the cutting edge 21. When the shearing stud 18 is cut off with the cutting edge 21 and the knife is moved further, the right half of the bearing surface 10 is levelled out or calibrated to the level of the left half by the projecting cam 25.

Various modifications of the method and the cutting knives of the invention may be made without departing from the spirit or scope thereof and it is to be understood that the invention is intended to be limited only as defined in the appended claims.

What we claim is:

1. A method of making a trunnion (7) for a rocker arm (1) or a finger lever of an internal combustion engine from a piece of rod-shaped round stock (14) by removal of a peripheral section (19) to produce a flat bearing surface (14), comprising forming the round stock (14) into a barrel-shaped blank (15) by upsetting, shaping the barrel-shaped blank (15) into a rotationally symmetrical element (16) comprising a central shoulder (17) having a uniform diameter which is larger than the diameter of the trunnion (7), and removing the peripheral section (19) at any point from the central shoulder (17) by shearing from two sides thereof in lengthwise axial direction of the rotationally symmetrical element (16) whereby, in a cutting plane, material from the central shoulder (17) is directed towards a sheared surface so that the bearing surface (10) thus produced is a hardened surface.

2. The method of claim 1 wherein the rotationally symmetrical element (16) comprising the central shoulder (17) is produced by a chipping procedure.

3. The method of claim 1 wherein the central shoulder (17) is cylindrical in shape.

4. The method of claim 1 wherein the central shoulder (17) is spherical in shape.

5. The method of claim 2 wherein the central shoulder (17) is cylindrical in shape.

6. The method of claim 1 wherein shearing is continued till a shearing stud (18) is formed at a center of the central shoulder (17), and said stud (18) is cut-off in a subsequent separate work step.

7. A method of making a trunnion (7) for a rocker arm (1) or a finger lever of an internal combustion engine, comprising at least one bearing surface (10) extending parallel to a lengthwise axis of the trunnion characterized in that removing a peripheral section (19) from the trunnion (7) by shearing with cutting knives being moved towards each other in a cutting plane parallel to said lengthwise axis of the trunnion (10) whereby a part of a material in the cutting plane is directed towards a sheared surface so that the bearing surface (10) thus obtained is a hardened surface.

* * * * *